United States Patent
Halliday et al.

(10) Patent No.: US 6,698,333 B2
(45) Date of Patent: Mar. 2, 2004

(54) CARTRIDGE FOR THE PREPARATION OF WHIPPED BEVERAGES

(75) Inventors: Andrew M. Halliday, Oxon (GB); Howard S. Whitney, Northampton (GB)

(73) Assignee: Kraft Foods R & D Inc. (DE)

(*) Notice: Subject to any disclaimer, the term of this patent is extended or adjusted under 35 U.S.C. 154(b) by 0 days.

(21) Appl. No.: 10/216,157

(22) Filed: Aug. 8, 2002

(65) Prior Publication Data

US 2003/0033938 A1 Feb. 20, 2003

Related U.S. Application Data

(63) Continuation of application No. PCT/GB01/00505, filed on Feb. 8, 2001.

(30) Foreign Application Priority Data

Feb. 14, 2000 (GB) .............................................. 0003355

(51) Int. Cl.[7] .......................... A47J 31/00; B65D 81/34
(52) U.S. Cl. .......................... 99/295; 99/323.1; 426/82; 426/77
(58) Field of Search ................................ 99/295, 323.1, 99/323; 426/77, 82, 106, 84, 433, 435

(56) References Cited

U.S. PATENT DOCUMENTS 4,853,234 A * 8/1989 Bentley et al. ........... 99/295 X

FOREIGN PATENT DOCUMENTS

| EP | 0449 533 | 10/1991 |
| EP | 0 638 486 | 2/1995 |

* cited by examiner

*Primary Examiner*—Reginald L. Alexander
(74) *Attorney, Agent, or Firm*—Fitch, Even, Tabin & Flannery

(57) ABSTRACT

A cartridge containing one or more beverage ingredients and being formed from substantially air- and water-impermeable materials, the cartridge comprising an inlet for the introduction of an aqueous medium into the cartridge, a compartment containing the beverage ingredient or ingredients and an outlet for the beverage produced from the beverage ingredients, characterized in that the cartridge incorporates in the beverage flow path, prior to or at outlet, a device for producing a jet of the beverage, at least one inlet for air and a device to generate a pressure reduction of the jet of beverage, whereby in use air from the at least one air inlet is incorporated into the beverage as a plurality of small bubbles.

20 Claims, 6 Drawing Sheets

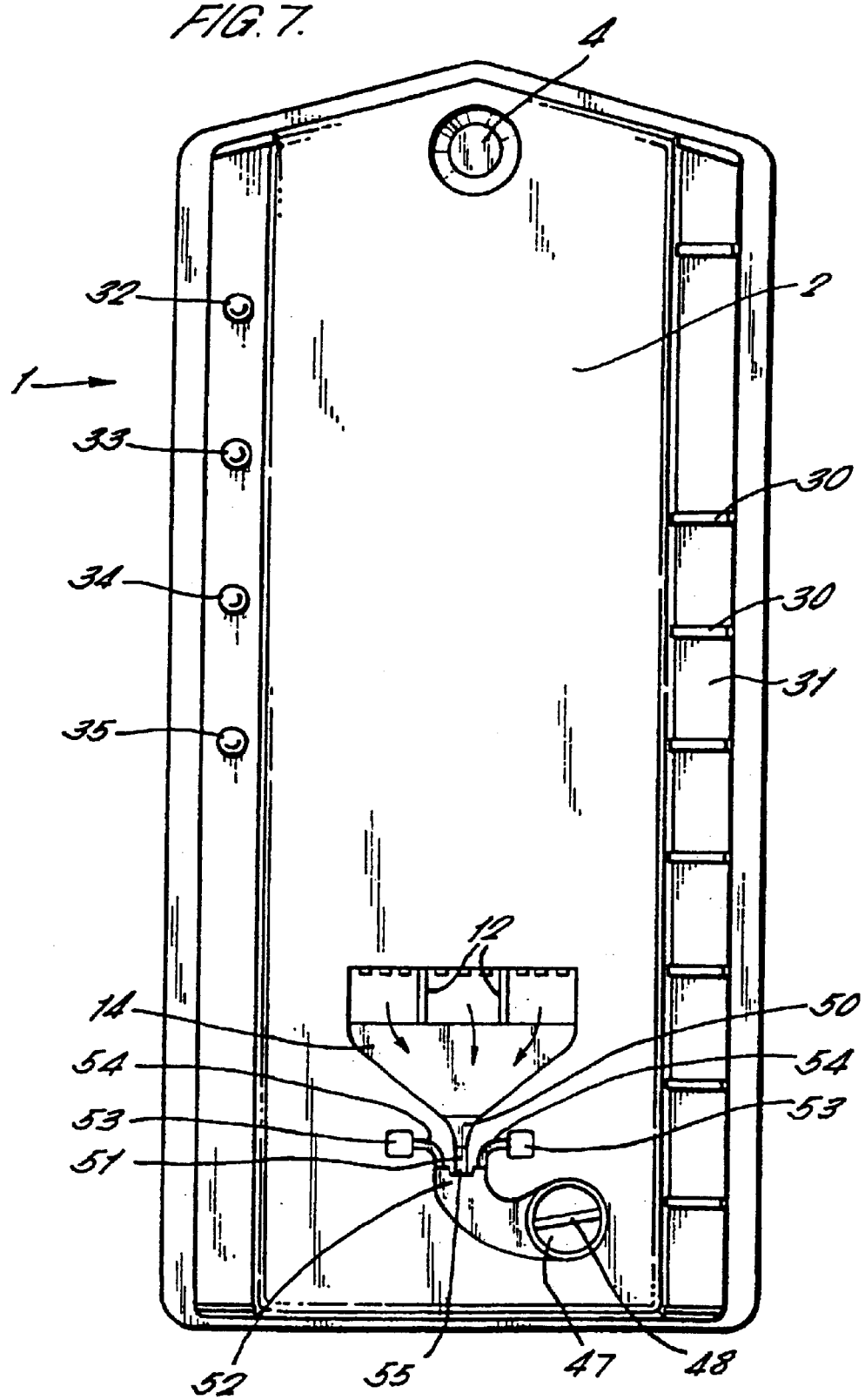

CARTRIDGE FOR THE PREPARATION OF WHIPPED BEVERAGES

This is a continuation, of prior application number PCT/GB01/00505, filed Feb. 8. 2001, designating the United States of America, which is hereby incorporated herein by reference in its entirety.

The present invention relates to a cartridge for the preparation of whipped beverages and, in particular, to sealed cartridges which are formed from substantially air- and water-impermeable materials and which contain one or more ingredients for the preparation of beverages.

It has previously been proposed to seal beverage preparation ingredients in individual air-impermeable packages. For example, cartridges or capsules containing compacted ground coffee are known for use in certain coffee making machines which are generally termed "espresso" machines. In the production of coffee using these coffee machines the coffee cartridge is placed in a brewing chamber and hot water is generally caused to pass under pressure through the cartridge, thereby extracting the aromatic coffee constituents from the ground coffee and producing a coffee beverage. Typically in the production of "espresso" coffee a brewing time of about 25 seconds is used at a pressure of about $6 \times 10^5$ Pa, or greater.

Cartridges containing roast and ground coffee in which hot water flows under gravimetric force through the cartridge are also known. A cartridge of this general type is described in British Patent No. 1397116.

In EP-A-0272922 there is described a package which contains at least one beverage preparation ingredient, e.g. roast and ground coffee. In a preferred embodiment the package is formed from a substantially air- and water-impermeable material and comprises a sealed body portion having a compartment containing the beverage ingredient and an outlet channel, the compartment and the outlet channel cooperating in such a manner that, in use, the beverage is filtered, thereby avoiding the necessity for an external filter.

There is also described in EP-A-0272922 a method for preparing a beverage which comprises positioning the beverage containing package at a brewing station, introducing water through water introduction means into the package, allowing the water to commingle with the beverage ingredient, and collecting the beverage so-formed through an outlet formed in the package.

The beverage packages as described in EP-A-0272922 are primarily intended to be used with a beverage preparation machine which handles the packages automatically or semi-automatically. A machine of this type is described in EP-A-0334572. The packages may contain roast and ground coffee, leaf tea or one or more powdered beverage preparation ingredients such as powdered chocolate, powdered coffee or powdered soup.

The machines described in EP-A-0272922 operate at a relatively low pressure of less than $2 \times 10^5$ Pa and thus, although by varying the amount of water introduced into packages containing roast and ground coffee it is possible to obtain a coffee beverage of the same strength as "espresso" coffee, it is not possible to incorporate gases into the coffee beverage at this pressure to provide the beverage with the foamed texture and appearance of "espresso" coffee.

EP-A-0638486 describes a cartridge operating at relatively low pressure which is capable of producing whipped beverages. The cartridge contains one or more beverage ingredients and comprises an inlet for the introduction of an aqueous medium, or compartment containing the one or more beverage ingredients, an outlet for the beverage produced from the beverage ingredient(s) and whipping means provided in the path of the beverage prior to the outlet to whip the said beverage. The whipping means generally comprises an impeller which is adapted to engage an external driving device on the beverage preparation machine, for example a machine of the type as described in EP-A-0334573.

Although an "espresso" coffee is produced using the cartridge and method as described in EP-A-0638486, this solution requires the modification of the beverage preparation machine as described in EP-A-0334573, which is expensive. There still therefore remains a requirement for a suitable means to produce an "espresso" coffee in a simple and effective manner at a relatively low pressure, e.g. of up to $2 \times 10^5$ Pa.

Accordingly, the present invention provides a cartridge containing one or more beverage ingredients and being formed from substantially air- and water-impermeable materials, the said cartridge comprising an inlet for the introduction of an aqueous medium into the cartridge, a compartment containing the beverage ingredient or ingredients and an outlet for the beverage produced from the beverage ingredients, characterized in that the cartridge incorporates in the beverage flow path, prior to or at the outlet, means for producing a jet of the beverage, at least one inlet for air and means to generate a pressure reduction of the jet of beverage, whereby in use air from the at least one air inlet is incorporated into the beverage as a plurality of small bubbles.

It will be understood that by the term "cartridge" as used herein is meant any package, sachet or receptacle which contains one or more beverage ingredients and from which a beverage may be produced.

In use, the cartridge of the present invention will have water under pressure passed therethrough. Generally the pressure within the compartment containing the beverage ingredients will be in the range of from 0.7 to $2.0 \times 10^5$ Pa.

The means to produce a jet of the beverage generally comprises a restriction in the flow path of the beverage, preferably at least one restriction hole or nozzle.

It will be understood that a plurality of jets may be produced, in which case a plurality of restrictions would be incorporated into the beverage flow path, for example a plurality of restriction holes or nozzles.

The cross-sectional area of the restriction hole(s) or nozzle(s) will generally be chosen to give a flow rate of the jet of beverage of from 3 to 20 metres per second, preferably 8 to 16 metres per second and more preferably about 10 metres per second. Typical cross-sectional areas are in the range of from 0.3 mm² to 0.8 mm².

The means to generate a pressure reduction of the beverage will generally comprise a chamber or conduit opening which allows expansion and mixing of the beverage to occur.

At least one air inlet is provided. The air inlet(s) will generally comprise one or more narrow passages which connect from the outside of the cartridge which is at atmospheric pressure to the chamber or conduit opening where the pressure reduction of the beverage occurs. Preferably, the air inlet is positioned as close as possible to the restriction hole or nozzle.

In one embodiment of the invention, a surface is incorporated into the beverage flow path, between the means for producing the jet of beverage and the outlet, onto which the jet of the beverage impinges. The angle between the path of the jet of beverage and the surface onto which it impinges is preferably at an included angle of 20 to 50 degrees, more preferably from 25 to 35 degrees. The surface onto which the jet of beverage impinges may, if desired, be textured, for example the surface may comprise a plurality of ribs, grooves or projections.

In another embodiment of the invention, the jet of beverage with air entrained from the air inlet, is passed to a mixing tube where the two phase mixture expands to fill the mixing tube and air bubbles are formed therein.

The cartridge of the present invention preferably has a body portion which may be formed, for example, from a moulded plastics material such as polypropylene. The inlet and/or outlet of the cartridge may be closed by a plug of a plastics material moulded into the inlet and/or outlet nozzle during the moulding of the body portion. Alternatively, the inlet and/or outlet may be covered by a substantially air- and water-impermeable material, for example aluminium foil or a laminated material, such as a laminate of plastic material/metal foil/plastic material prior to the opening of the inlet and/or outlet. Specific examples of materials which may be used are aluminium foil having a thickness in the range of from 30 to 60 micrometres coated with a layer of polypropylene or a laminate of polypropylene/aluminium foil/polyester.

The outlet in the cartridge may be prepared during the beverage preparation cycle using a cutting and piercing tool for example of the type as described in our EP-A-0334573.

Alternatively, the inlet and/or outlet may be open and the cartridge provided with an outer wrapping or the like. For example, a plurality of packages may be provided with a shrink wrapped outer layer.

In the cartridge of the present invention, the communication between the inlet and the compartment containing the beverage preparation ingredient(s) is preferably via a channel which is separated from the compartment by a wall which has a plurality of openings formed therein for the entry of a liquid medium into the compartment. The channel preferably extends along at least one side of the compartment, more preferably along three sides of the compartment. The openings in the wall are preferably in the form of elongate slots which are generally arranged in a manner such that an even distribution of the liquid medium through the beverage preparation ingredients is achieved.

The cartridge of the present invention may have a filter disposed between the compartment containing the beverage ingredient(s) and at least a part of the under surface of the top of the cartridge, one or more passages being formed between the filter and the top of the cartridge, the passages communicating with the outlet. This type of cartridge is particularly preferred when the beverage ingredient is roast and ground coffee.

The filter is preferably made from a material with a high wet strength, for example a non-woven fibre material of polyester. Other materials which may be used include a water-impermeable cellulosic material, such as a cellulosic material comprising woven paper fibres. The woven paper fibres may be admixed with fibres of polypropylene, polyvinylchloride and/or polyethylene. The incorporation of these plastics materials into the cellulosic material renders the cellulosic material heat-sealable. The filter material may also be coated with a material which is activated by heat and/or pressure so that it can readily be sealed to ribs formed in the under surface of the top of the package, thereby forming one or more passages which communicate with the outlet.

The beverage preparation ingredients contained in the cartridges of the invention are preferably roast and ground coffee, powdered chocolate, and according to individual taste, powdered milk or creamer, sugar or artificial sweetener.

It will be understood that it may be convenient for the compartment containing the beverage preparation ingredients to be separated into two or more sections, for example, one section containing roast and ground coffee and another section containing powdered milk or creamer. In such an arrangement the means for the entry of the liquid medium into the separate compartments would be varied to suit the requirements for filtration or dissolution of the particular ingredients.

The cartridge of the present invention, when filled with roast and ground coffee, preferably contains from 2.5 to 10 grams of roast and ground coffee, preferably from 4.5 to 7 grams for the preparation of a single cup. However, cartridges which are intended to provide multiple servings of coffee will contain an appropriate amount of roast and ground coffee, for example, packages intended to provide say five cups of coffee will contain from 20 to 50 grams of roast and ground coffee, preferably from 25 to 30 grams. The roast and ground coffee is generally compacted when the beverage package is filled in order to aid the distribution and transport of water through the package.

The cartridges of the present invention are preferably provided with at least one recognition means whereby, in use, the cartridge is identified by the machine into which it is placed for treatment and the identification of the cartridge thereby causes it to be subjected to the correct treatment steps including the introduction of the aqueous medium into the cartridge and the activation of the whipping means.

The recognition means may comprise one or more surface features formed in the body of the cartridge. For example, the cartridge body may be provided with one or more indents, cut outs, protrusions or holes which can be identified by a mechanical sensor in the beverage preparation machine, the mechanical sensor registering the presence or absence of the indents, cut outs, protrusions or holes.

The recognition means may, alternatively, comprise a system which can be sensed by a simple optical device, for example a bar code printed onto the body of the cartridge, a pattern of through holes in the cartridge, a pattern of contrasting tones or colours printed onto the cartridge or cartridges containing different comestibles being of different colours.

The recognition means may also comprise one or more strips of a magnetic material applied to the body of the cartridge which can be read by an appropriate magnetic sensor, one or more shaped or divided areas of metal foil applied to the cartridge body which cause an inductive effect on movement of the cartridge in the machine, which inductive effect can be sensed; or one or more electrically conductive areas formed on the body of the cartridge which can be sensed electrically.

As mentioned above, the cartridge of the present invention contains one or more beverage preparation ingredients, for example, roast and ground coffee or leaf tea and sugar and/or creamer, as desired. One machine which can readily be adapted for the preparation of a beverage from the preferred cartridge of the invention which includes a recognition means is described in our EP-A-0334573. The only modification required to be made to such a beverage preparation machine is to incorporate an appropriate sensor or sensors into it, the sensor or sensors being designed to read the particular coding on the cartridge and to send a signal to the controller, which then selects the appropriate beverage preparation cycle and activates the whipping means.

The sensor may be, for example, a mechanical sensor, an optical sensor, a magnetic sensor, an electrical sensor or an inductive sensor. The machine is preferably adapted so that the cartridge is handled automatically following its insertion into the machine.

The incorporation of air into the beverage using the cartridges of the present invention produces a foamy, frothy beverage. Beverages which can be produced in this manner are, for example, whipped chocolate, cappuccino and espresso-type coffee. Preferably the incorporation of air into the beverage will result in from 5 to 35 percent by volume, more preferably 5 to 10 percent by volume, of air being incorporated into the beverage as bubbles having a bubble size preferably of below 300 micrometers, more preferably in the range of from 10 to 200 micrometers. Generally, whipped chocolate will incorporate a higher percentage of air by volume therein than whipped coffee.

The present invention will be further described with reference to the accompanying drawings, in which:

FIG. 7 is a view from above of a still further beverage cartridge of the invention.

Figure 1:
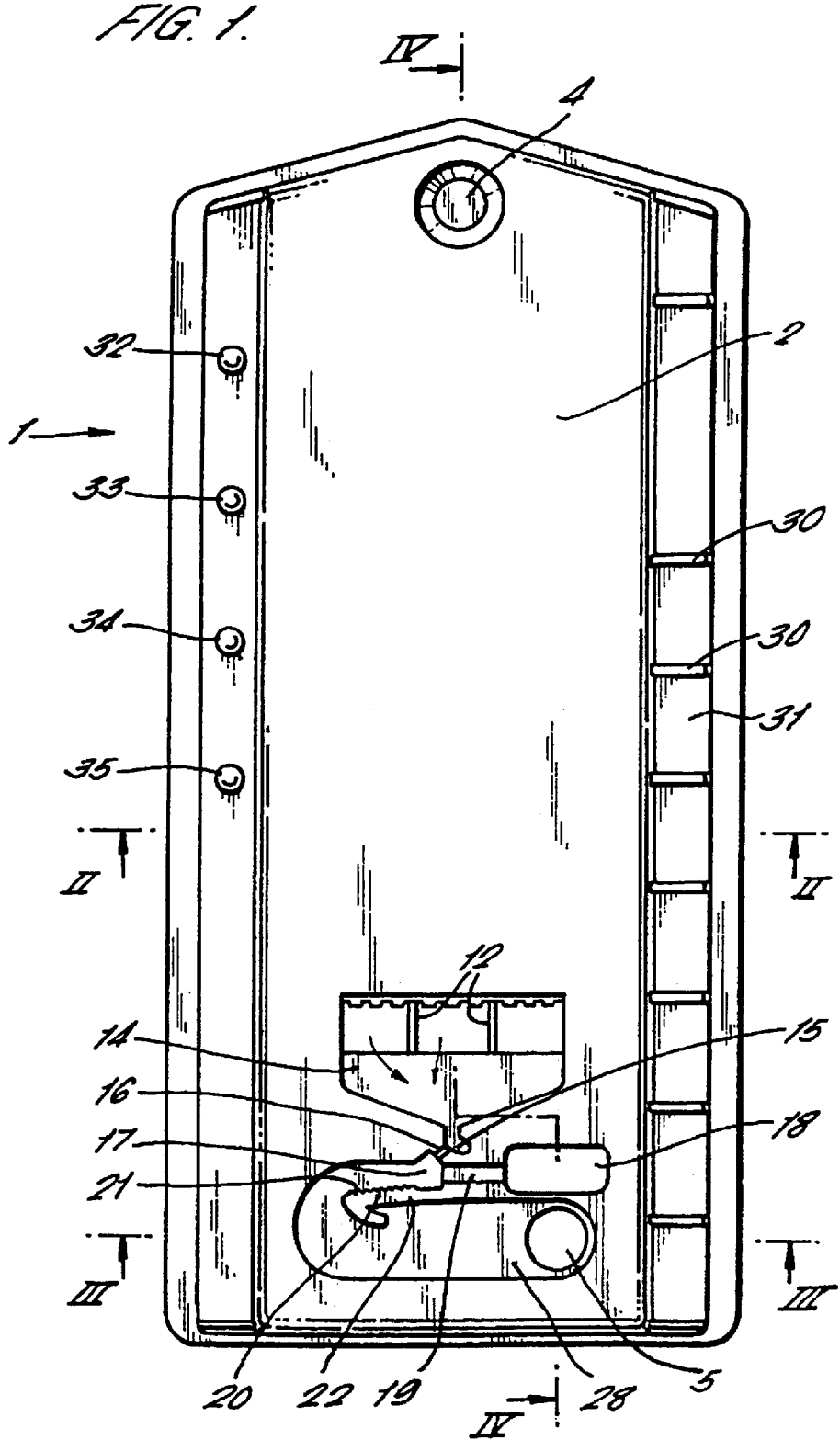
FIG. 1 is a view from above of a beverage cartridge of the invention.
Figure 2:
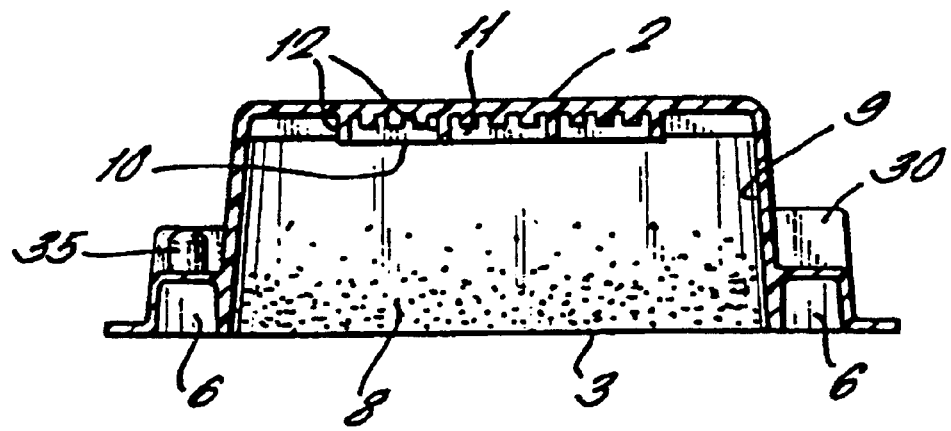
FIG. 2 is a section through the beverage cartridge of FIG. 1 along the line II—II.
Figure 3:
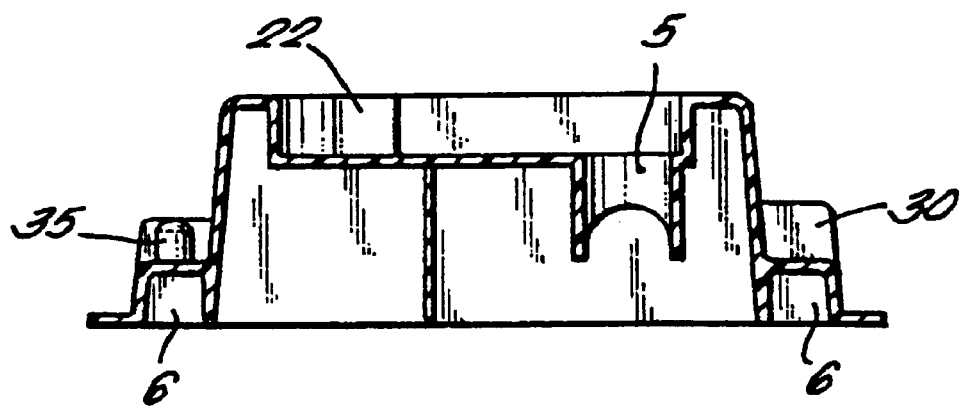
FIG. 3 is a section through the beverage cartridge of FIG. 1 along the line III—III.
Figure 4:
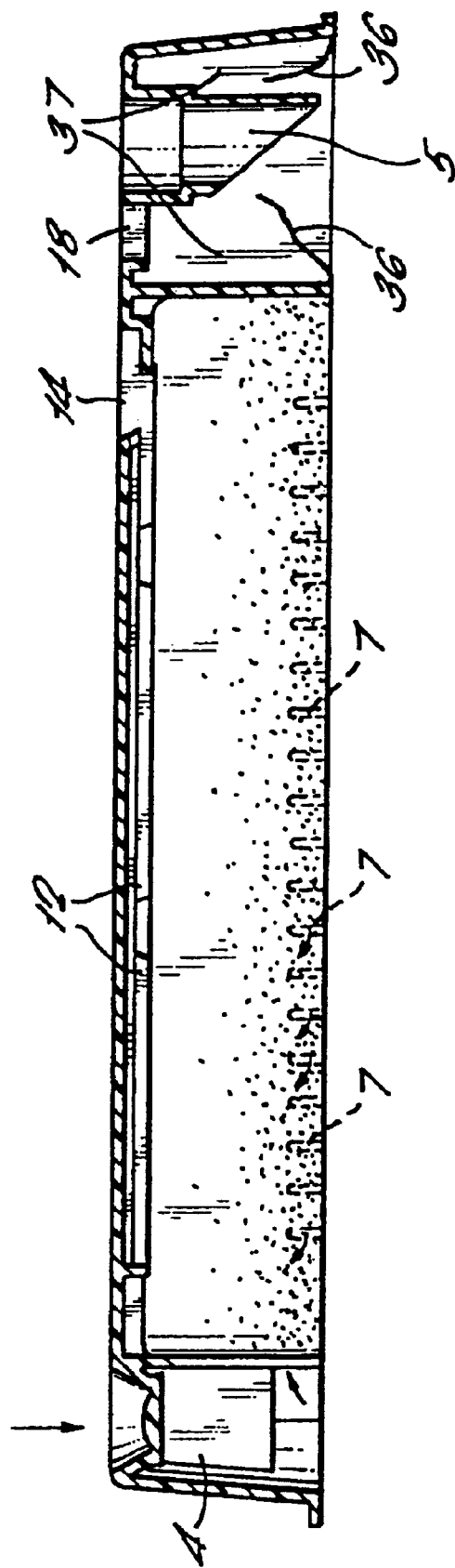
FIG. 4 is a section through the beverage cartridge of FIG. 1 along the stepped line IV—IV.

Referring to FIGS. 1 to 4 of the drawings, a cartridge of the present invention is shown generally at 1. The cartridge is mainly formed from a moulded plastics material and has a top 2 which may be decorated to identify the contents of the capsule, or which may have foil or paper laminated thereto with appropriate identification thereon. The bottom 3 of the capsule may be formed from an aluminium foil or a laminated foil.

The cartridge 1 has an inlet 4 and an outlet 5 which are formed in use of the cartridge by piercing or cutting the material covering the inlet and outlet openings.

In use, water under pressure enters the cartridge 1 via inlet 4 where it enters channel 6 formed along the edges of the package and communicates via slots 7 with the beverage ingredients 8 which are contained in a compartment within the cartridge. The water mixes with the beverage preparation ingredients contained within compartment 9 and is forced upwardly through the beverage preparation ingredients. The beverage formed by passage of water through the beverage preparation ingredients passes through the filter material 10 into a plurality of passages which are formed between ribs 12 onto which the filter paper is sealed. The sealing of the filter material onto ribs 12 prevents any short circuit and all of the beverage has to pass through the filter. The passages 11 are closed at the end remote from the outlet by transverse ribs (not shown). The beverage collected via the passages 11 is funnelled in area 14 in the direction as shown by the arrows.

Beverage collected in the area 14 passes to a dog leg collecting space 15 which is connected by a restriction hole 16 to an expansion chamber 17. The beverage is forced under pressure through the restriction hole by the back pressure of the beverage collecting in the areas 14 and 15. The pressure inside the beverage containing compartment of the cartridge will generally be in the range of from 0.7 to $2\times10^5$ Pa. The cross-sectional area of the restriction hole will be chosen so as to give a flow rate of the jet of beverage of about 3 to 20 metres per second, preferably 8 to 16 metres per second and more preferably about 10 metres per second. To achieve a flow speed of 10 metres per second a restriction hole of cross-sectional area of from 0.3 mm$^2$ to 0.8 mm$^2$, preferably about 0.45 mm$^2$ is generally used in order to deliver a beverage of volume of 60 ml in 12 seconds.

The chamber 17 into which the jet of beverage is delivered is at atmospheric pressure and is connected to an air inlet area 18 by means of an elongate passage 19. Chamber 17 acts as an expansion chamber and, as the pressure of the jet of beverage is reduced, air is incorporated into the beverage via the air passage 19. The jet of beverage issuing through restriction hole 16 impinges on a surface 20 which is positioned in the beverage flow path. The surface 20 onto which the beverage impinges is at an included angle of from 30 to 35 degrees, preferably an included angle of about 33 degrees. The surface 20 has a plurality of grooves 21 cut therein. The impingement of the jet of beverage on the grooves 21 assists in causing turbulent motion of the beverage and the incorporation of air therein as a plurality of discrete bubbles. The surface 20 is formed on one side of a projecting tongue 22 which projects into the path of the beverage.

The beverage, after impingement on surface 20, around the end of the projecting tongue 22 travels along passage 28 to the outlet 5. In order to maintain the volume of bubbles in the beverage it is preferred that a cup or other receptacle should be positioned close to the outlet in order to avoid dissipation of the bubbles as the beverage is collected.

Figure 5:
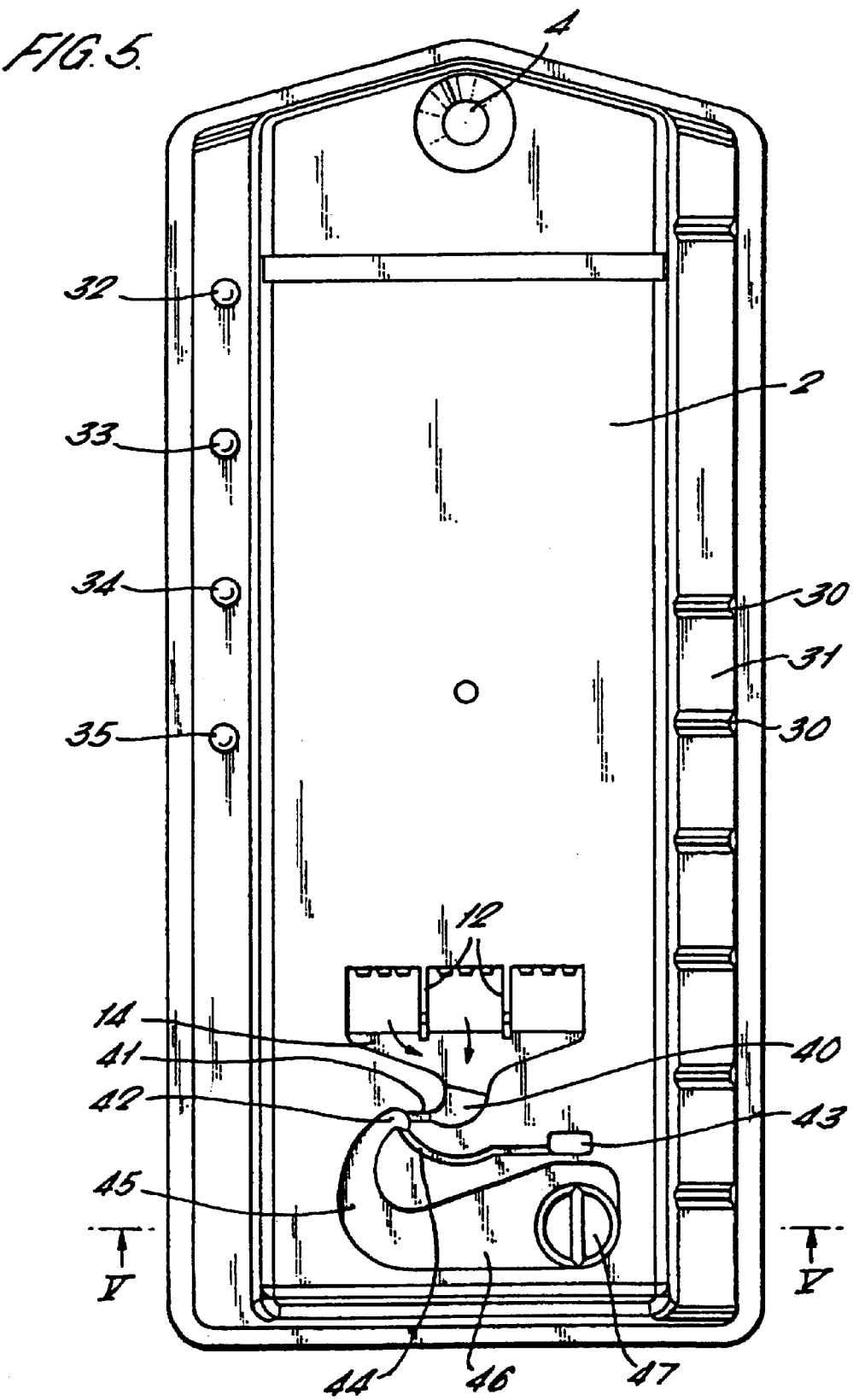
FIG. 5 is a view from above a further beverage cartridge of the invention.
Figure 6:
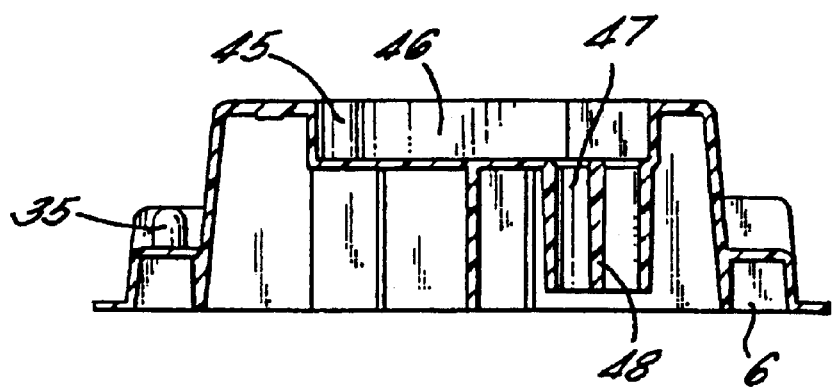
FIG. 6 is a section of the beverage cartridge of FIG. 5 along the line V—V.

An alternative cartridge of the present invention is illustrated in FIGS. 5 and 6. Many of the features of this alternative cartridge are the same as the cartridge of FIGS. 1 and 4 and like numerals are used to describe like features. Beverage is therefore produced in the cartridge of FIG. 5 in the same manner as the cartridge of FIG. 1. Beverage so produced is collected in area 14 and passed to a collecting space 40 which is connected by a restriction hole 41 to an expansion chamber 42. The collecting space 40 has a bell mouth adjacent to the entry to hole 41 in order to minimize pressure drop at the entrance to the hole. The beverage is forced under pressure through the restriction hole 41 by the back pressure of the beverage in collecting areas 14 and 40.

The chamber 42 into which the jet of beverage is delivered is at atmospheric pressure and is connected to an air inlet 43 by means of a narrow elongate passageway 44. The air inlet 43 is positioned adjacent to the exit of the restriction hole 41. Chamber 42 acts as an expansion chamber and, as the pressure of the jet of beverage is reduced, air is incorporated into the beverage via the air passageway 44. The jet of beverage issuing from the restriction hole 41 impinges on the surface of the chamber 42 at an included angle of about 39°.

In contrast to FIG. 1, the sides of the expansion chamber 42 are generally smooth. The expansion chamber 42 widens to a throat area 45 and widens further into a flared collecting area 46 immediately prior to the outlet 47. The outlet 47 is provided with a rib 48 to prevent the beverage spraying and/or splashing as it exits from the cartridge.

The general shape and structure of the expansion chamber 42, throat area 45 and collecting area 46 is of smooth flowing curves to prevent unwanted turbulence as the beverage travels to the outlet 47 to prevent the break up of bubbles during the final stage of the travel of the beverage to the outlet.

A further alternative cartridge of the present invention is illustrated in FIG. 7. Features of this cartridge which are the same as the cartridges of FIGS. 1 to 4, or 5 and 6 are represented by like numerals. Beverage is therefore produced in the cartridge of FIG. 7 in the same manner as the cartridge of FIG. 1. Beverage so produced is collected in area 14 and passed to a collecting space 50 which is connected by a restriction nozzle 51 to an expansion chamber 52. The collecting space 50 is of a funnel shape and thereby funnels the beverage produced into the cartridge into the restriction nozzle 51. The beverage is forced under pressure through the restriction nozzle 51 by the back pressure of the beverage in collecting areas 14 and 50. The chamber 52 into which the beverage is delivered is at atmospheric pressure and is connected to two air inlets 53 by means of narrow passageways 54. The air inlets 53 are positioned on either side of the exit 55 of the nozzle 51 into the expansion chamber 52. Chamber 52 acts as an expansion chamber and, as the pressure of the jet of beverage is reduced, air is incorporated into the beverage via the air passageways 54. The jet of beverage issuing from the exit 55 of the nozzle 51 impinges on the surface of the expansion chamber 52 opposite to the exit at an included angle of about 49°.

The expansion chamber 52 is of generally arcuate shape and the shape and structure is of smooth flowing curves to prevent unwanted turbulence as the beverage travels to the outlet 47. This prevents the break up of bubbles during the final stage of the travel of the beverage to the outlet 47. The outlet is provided with a rib 48 to prevent the beverage spraying or splashing as it exists from the cartridge.

The cartridge as described with reference to FIGS. 1 to 4, or 5 and 6, or 7 is suitable for insertion into a beverage preparation machine, for example of the type as described in EP-A-0334573, longitudinally through a slot.

The cartridge is also provided, as best shown in FIG. 1 with teeth 30 moulded along one side edge of the cartridge. The teeth 30 have recesses 31 formed therebetween. The teeth 30 are intended to enable the cartridge to be driven through a beverage preparation machine by the engagement of the teeth 30 with a drive mechanism.

The side edge of cartridge 1 opposite to the edge provided with teeth 30 has a plurality of pegs 32, 33 34 and 35 provided thereon. As the package is driven into the machine the presence or absence of the upstanding pegs 32, 33, 34, 35 is sensed by a sensing arm (not shown). If one or more of pegs 32, 33, 34, 35 is not present the sensing arm will thereby identify a different type of cartridge. The sensing arm operates a switch in the beverage preparation machine (not shown) which thereby transmits information concerning the presence or absence of the pegs on the package to the control mechanism for the beverage dispensing machine. The arrangement of pegs 32, 33, 34, 35 on the cartridge thus identifies the type of cartridge to a controller which then selects the appropriate beverage preparation conditions.

When the beverage preparation machine has selected the appropriate beverage preparation conditions, the water inlet 4 of the package is pieced or cut, the outlet 5 in the package is uncovered and the foil 36 originally covering the outlet 5 is folded back into an outlet surround chamber 37. Water is caused to flow under pressure through the compartment containing the beverage ingredients and the chosen beverage is then collected in a cup or receptacle placed below the outlet 5 of the package.

What is claim is:

1. A cartridge containing one or more beverage ingredients and being formed from substantially air- and water-impermeable materials, the said cartridge comprising an inlet for the introduction of an aqueous medium into the cartridge, a compartment containing the beverage ingredient or ingredients and an outlet for the beverage produced from the beverage ingredients, wherein the cartridge incorporates in the beverage flow path, prior to or at the outlet, means for producing a jet of the beverage, at least one inlet for air and means to generate a pressure reduction of the jet beverage, whereby in use air from the at least one air inlet is incorporated into the beverage as a plurality of small bubbles.

2. A cartridge as claimed in claim 1 wherein the means to produce a jet of the beverage comprises a restriction in the flow path of the beverage.

3. A cartridge as claimed in claim 2 wherein the restriction comprises at least one restriction hole or nozzle.

4. A cartridge as claimed in claim 3 wherein the restriction hole or nozzle has a cross-sectional area of from 0.3 to 0.8 mm$^2$.

5. A cartridge as claimed in claim 3 wherein the means to generate a pressure reduction of the beverage comprises a chamber or conduit opening which allows expansion and mixing of the beverage to occur.

6. A cartridge as claimed in claim 5 wherein a surface is incorporated into the beverage flow path, between the means for producing the jet of beverage and the outlet, onto which the jet of the beverage impinges.

7. A cartridge as claimed in claim 6 wherein the angle between the path of the jet of beverage and the surface onto which it impinges is at an included angle of from 20 to 50 degrees.

8. A cartridge as claimed in claim 7 wherein the included angle is from 25 to 35 degrees.

9. A cartridge as claimed in claim 7 wherein the surface onto which the jet of beverage impinges is textured.

10. A cartridge as claimed in claim 9 wherein the surface comprises a plurality of ribs, grooves or projections.

11. A cartridge as claimed in claim 10 wherein the inlet and/or outlet is covered by a substantially air- and water-impermeable material prior to the formation, in use, of the inlet and/or outlet in the cartridge.

12. A cartridge as claimed in claim 11 wherein a channel communicates with the inlet for the entry of an aqueous medium into the package, the channel being separated from the compartment containing the beverage ingredient or ingredients by a wall which has a plurality of openings formed therein for the entry of the aqueous medium into the compartment containing the beverage preparation ingredient (s).

13. A cartridge as claimed in claim 11 wherein the channel extends along at least one side of the compartment containing the beverage preparation ingredient(s).

14. A cartridge as claimed in claim 13 wherein the channel extends along three sides of the compartment containing the beverage preparation ingredient(s).

15. A cartridge as claimed in any one of claim 14 wherein the opening comprise a plurality of elongate slots.

16. A cartridge as claimed in claim 15 wherein a filter is disposed between the compartment and at least a part of the under surface of the top of the cartridge, one or more passages being formed between the filter and the top of the cartridge, which passage(s) communicate(s) with the outlet.

17. A cartridge as claimed in claim 16 wherein the filter is made from a water-impermeable material.

18. A cartridge as claimed in claim 17 wherein the beverage preparation ingredient is powdered chocolate, instant cappuccino or roast and ground coffee.

19. A cartridge as claimed in claim 18 which is provided with at least one recognition means whereby, in use, the cartridge is identified by the machine into which it is placed for treatment therefrom and the identification of the cartridge thereby causes it to be subjected to the correct treatment steps including the introduction of an aqueous medium into the cartridge and the engagement of the whipping means by an external driving device incorporated into the machine.

20. A cartridge as claimed in claim 19 wherein the recognition means comprises one or more surface features formed in the body of the cartridge.

* * * * *

UNITED STATES PATENT AND TRADEMARK OFFICE
CERTIFICATE OF CORRECTION

PATENT NO.     : 6,698,333 B2
DATED          : March 2, 2004
INVENTOR(S)    : Halliday et al.

It is certified that error appears in the above-identified patent and that said Letters Patent is hereby corrected as shown below:

Column 8,
Line 53, delete "any one of".
Line 54, change "comprise" to -- comprises --.

Signed and Sealed this

First Day of March, 2005

JON W. DUDAS
*Director of the United States Patent and Trademark Office*